2,807,656
ETHYL CHLORIDE PRODUCTION

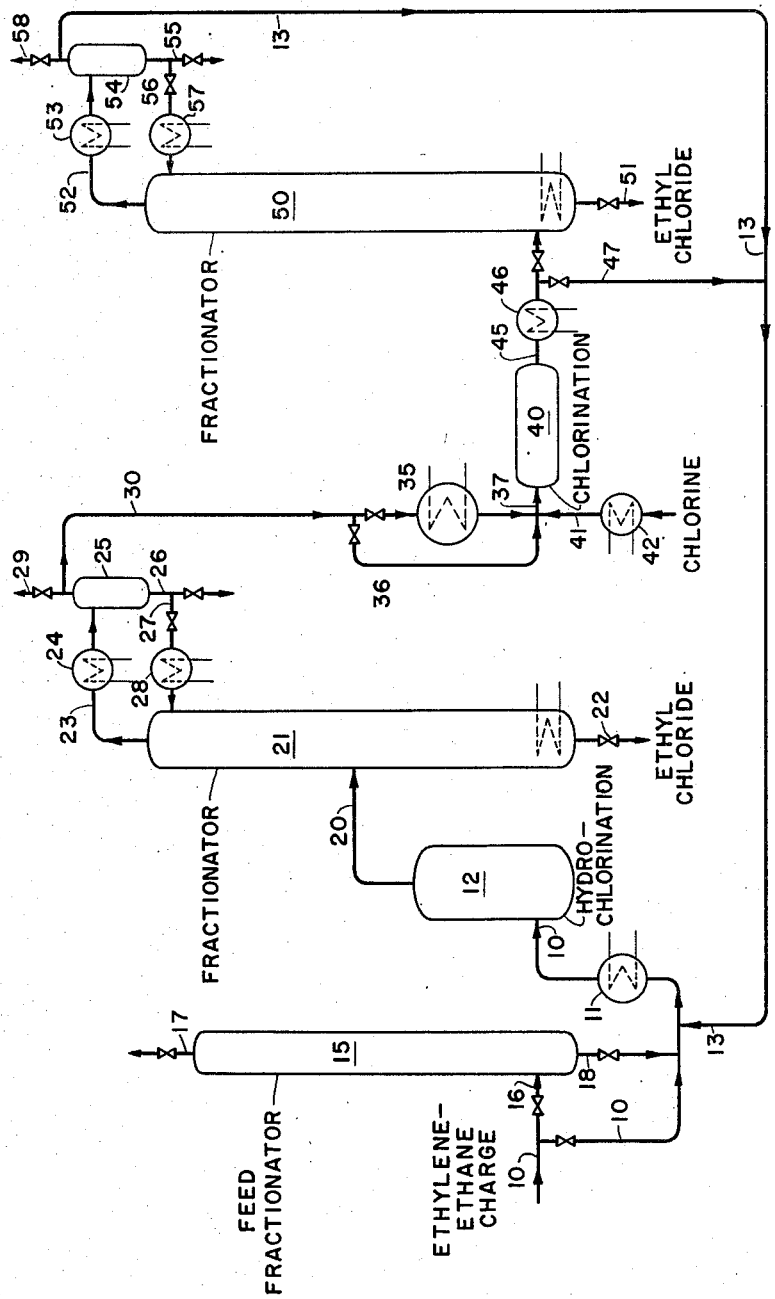
FIG. I
INVENTOR:
ALEXANDER J. CHERNIAVSKY
BY: E. Walter Mark
HIS AGENT

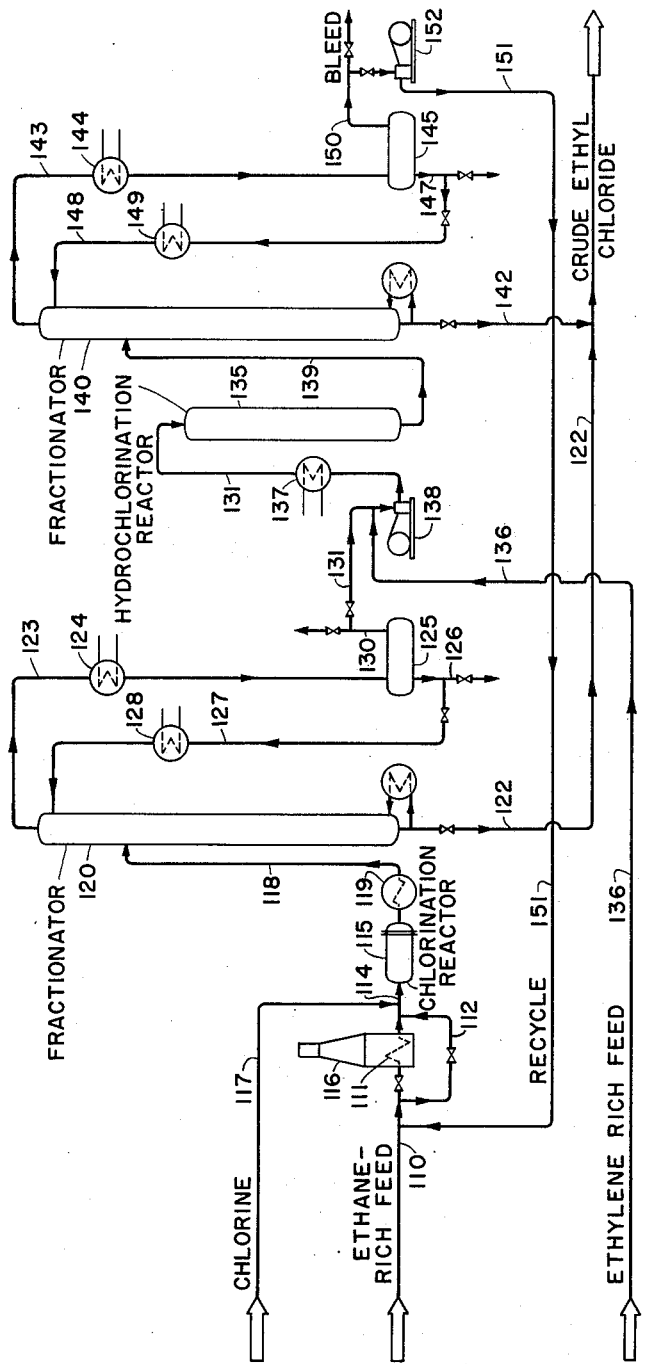
FIG. II
INVENTOR:
ALEXANDER J. CHERNIAVSKY
BY: *E. Walter Mack*
HIS AGENT

Alexander J. Cherniavsky, San Francisco, Calif., assignor to Shell Development Company, New York, N. Y., a corporation of Delaware Application January 28, 1957, Serial No. 636,680

13 Claims. (Cl. 260—662)

This invention relates to the production of ethyl chloride from normally gaseous hydrocarbons comprising ethylene. The invention relates more particularly to the production of ethyl chloride from normally gaseous hydrocarbons comprising ethylene and ethane without the need of hydrogen chloride from an outside source.

This application is a continuation-in-part of applications Serial No. 489,063, filed February 18, 1955, and Serial No. 580,819, filed April 26, 1956, now abandoned.

Ethyl chloride is of importance because of its application as starting or intermediate material in the production of valuable chemical derivatives. A potential source of starting material for the manufacture of this compound comprises the ethylene-containing mixtures as obtained in relatively large quantities in commercial scale treatment, refining and conversion of petroleum hydrocarbons. Readily available ethylene-containing hydrocarbon mixtures generally comprise this olefin in admixture with other hydrocarbons comprising ethane. Initial separation of a relatively pure ethylene before proceeding to the production of ethyl chloride therefrom increases considerably the process steps involved and consequently the cost of the ethyl chloride thereby produced. Subjecting the available mixtures substantially as such to conditions comprising olefin hydrochlorination by methods disclosed heretofore often entails difficulties militating against efficient operation of the process. Not an inconsiderable part of such difficulties and high cost of operation are directly attributable to reliance upon hydrogen chloride from an outside source as a charge material.

It is an object of the present invention to provide an improved process enabling the more efficient production of ethyl chloride from normally gaseous hydrocarbons comprising ethylene and ethane.

Another object of the invention is the provision of an improved process enabling the more efficient conversion of normally gaseous hydrocarbons comprising ethylene and ethane to ethyl chloride without the need of hydrogen chloride from an outside source.

A more specific object of the invention is the provision of an improved process enabling the more efficient production of ethyl chloride from normally gaseous hydrocarbons comprising ethylene and ethane wherein ethylene is subjected to hydrochlorinating conditions in the presence of hydrogen chloride produced within the system.

Other objects and advantages of the present invention will become apparent from the following detailed description thereof made with reference to the attached drawings wherein:

Figure I represents a more or less diagrammatic elevational view of a form of apparatus suitable for carrying out the process of the invention according to one embodiment thereof, where make-up feed to the system is introduced as a mixture comprising ethylene and ethane into a hydrochlorinating zone, and Figure II represents a modified form of apparatus suitable for carrying out the process of the invention according to another embodiment thereof, where make-up charge to the system is introduced according to a so-called split-feed arrangement, i. e., a feed rich in ethylene is charged to the hydrochlorinating zone while a feed rich in ethane is charged to a chlorinating zone.

Operation of the process according to either embodiment is characterized by the hydrochlorination of ethylene in admixture with substantial quantities of ethane, with the aid of hydrogen chloride formed within the system, followed by chlorination of residual ethane. The latter step produces reaction products comprising said hydrogen chloride formed within the system and at least in the case of split-feed operation, unreacted ethane. The hydrogen chloride, together with the unreacted ethane when present, is passed to the hydrochlorination step where it is admixed with make-up feed containing ethylene.

Referring to Figure I of the drawings, normally gaseous hydrocarbons comprising ethylene and ethane emanating from any suitable source are forced through valved line 10, provided with heat exchanging means, such as indirect heat exchanger 11, into a hydrochlorinating zone. The hydrochlorinating zone may comprise any suitable type of apparatus enabling subjection of ethylene to ethylene hydrochlorinating conditions therein. In the drawing the hydrochlorinating zone is depicted by a reaction chamber 12. Hydrogen chloride, emanating from within the system as described more fully below, is forced through line 13 into line 10 leading to chamber 12.

Within chamber 12 the normally gaseous hydrocarbon charge is subjected to conditions resulting in the interaction of hydrogen chloride with ethylene with the formation of ethyl chloride. The addition hydrochlorination of ethylene is preferably carried out under conditions at which no substantial interaction of ethane with hydrogen chloride takes place. Suitable ethylene hydrochlorinating conditions comprise, for example, those obtained with the aid of a suitable olefin hydrochlorinating catalyst. Thus, the ethylene-containing charge may be contacted within chamber 12 with a hydrochlorination catalyst comprising, for example, zinc chloride, optionally upon a suitable porous support material, at a temperature of, for example, from about 20° to about 300° C., and preferably from about 150° to about 250° C., at a superatmospheric pressure ranging, for example, from slightly above atmospheric to about 750 lbs., and preferably from about 75 to about 300 lbs. p. s. i. g. A promoter, such as, for example, a member of the group consisting of the divalent metals such as copper, lithium, antimony, magnesium, calcium, bismuth and the like, is preferably added to the catalyst.

Under the above-defined hydrochlorinating conditions, ethane is substantially inert and ethylene will react with hydrogen chloride with the formation of reaction products consisting essentially of ethyl chloride and unreacted ethane containing a minimum of by-products. High conversions, based on the hydrogen chloride present, are readily obtained over extended periods of continuous operation. The process of the invention is, however, in no wise limited to the maintenance of any specific hydrochlorinating conditions within chamber 12 and other suitable hydrochlorinating conditions enabling the addition of hydrogen chloride to the ethylene may be resorted to within the scope of the invention.

Other suitable catalyst which may be employed in carrying out the ethylene hydrochlorination in the vapor phase in chamber 12 comprise the chlorides of the trivalent metals, such as, for example, aluminum chloride, bismuth chloride, antimony chloride, iron chloride, vanadium chloride, and their oxychlorides, optionally supported upon solid support material. Suitable liquid phase hydrochlorinating conditions comprise the use of a catalyst such as, for example, aluminum chloride, bismuth chloride or iron chloride, optionally dissolves in a suitable solvent such as an alkyl chloride, for example, ethyl chloride, at a temperature below about 60° C. and at a pressure sufficiently high to maintain at least a substantial part of the reactants in the liquid phase.

Temperatures in chamber 12 are maintained within the desired range with the aid of suitable means, such as, for example, heat exchanger 11, and optionally by other means not shown in the drawing, enabling the addition or withdrawal of heat from reactants and from the reaction zone.

Hydrochlorinating conditions maintained within chamber 12 may vary considerably within the scope of the invention. Thus hydrochlorinating conditions enabling a high conversion of ethylene to the desired ethyl chloride may be employed. When hydrochlorinating conditions resulting in the substantially complete conversion of ethylene to ethyl chloride, with a relatively complete utilization of hydrogen chloride introduced into the chamber 12, are employed, the mol ratio of ethane to ethylene in the make-up normally gaseous hydrocarbon charge introduced into the system from an outside source through valved line 10, is preferably maintained at a value of about at least 1, for example, from about 1:1 to about 1.5:1. Higher or lower ratios of ethane to ethylene in the charge may, however, be employed within the scope of the invention. The methane content of the charge is preferably maintained at a minimum, for example, below about one mol percent.

A feed fractionation zone is provided to enable adjustment of the composition of the normally gaseous hydrocarbon feed introduced as make-up into the system. Such a feed fractionation zone may comprise, for example, a column 15. At least a part of the feed introduced into the system through valved line 10, may be by-passed through valved line 16 into column 15. Within column 15 the normally gaseous hydrocarbon feed is subjected to fractionating conditions resulting in the formation of a vapor overhead containing at least a substantial amount of the methane originally present in the charge to result in a liquid bottoms fraction containing less than about one mol percent methane. Sufficient two carbon-containing hydrocarbons may be taken overhead in column 15 to control the mol ratio of ethane to ethylene in the liquid bottoms.

Liquid bottoms comprising ethylene and ethane are taken from column 15 and forced through valved line 18, into line 10 leading to chamber 12.

Effluence from chamber 12, consisting essentially of ethyl chloride and unreacted ethane is passed through line 20 to suitable product separating means. Within the product separating means, ethyl chloride is separated from the reaction products as a final product. The product separating means may comprise, for example, a column 21. Within column 21, a vapor fraction comprising unreacted ethane is separated from a liquid fraction comprising ethyl chloride. The liquid fraction is eliminated from column 21 by means of valved line 22.

Vapors consisting essentially of unreacted ethane are taken overhead from column 21, through line 23 provided with condenser 24, leading into accumulator 25. Liquid consisting essentially of ethane is passed from accumulator 25 through lines 26, and line 27 provided with cooler 28, into the upper part of column 21 as reflux. A normally gaseous stream consisting essentially of ethane is taken from accumulator 25 and passed through lines 29, 30 and 37 into a chlorinating zone. Suitable means for controlling the temperature of the normally gaseous stream flowing through line 30, for example, an indirect heat exchanger 35, is positioned in line 30. The chlorinating zone may comprise any suitable apparatus enabling subjection of the ethane to substitutive chlorinating conditions. In the drawing, the chlorinating zone is depicted by chamber 40.

Chlorine emanating from an outside source is forced through line 41 into line 37 leading to chamber 40. Means for controlling the temperature of the chlorine charge, such as, for example, a heat exchanger 42, is provided to enable the heating or cooling of chlorine entering the system.

A particular advantage of the invention resides in the ability to send to the chlorinating zone the effluent stream leaving chamber 12 after removal of substantially only ethyl chloride therefrom. If desired, however, components which may at times be present, such as, chlorinated hydrocarbon by-products, residual ethylene, etc., may be removed in part or entirely from the charge to the chlorinating zone within the scope of the invention. Thus, the charge to the chlorinating zone may, if desired, be subjected to one or more such steps as, for example, adsorption, solvent extraction, distillation, extractive distillation, scrubbing, etc.

Within chamber 40, the normally gaseous hydrocarbon stream comprising ethane emanating from chamber 12, is subjected to substitutive ethane chlorinating conditions resulting in the interaction of ethane and chlorine with the formation of reaction products comprising ethyl chloride and hydrogen chloride. The invention is in no wise limited to the use of any specific substitutive ethane chlorinating conditions within chamber 40 and any conditions may be employed therein resulting in the conversion of ethane to reaction products comprising ethyl chloride and hydrogen chloride. The contents of chamber 40 may be subjected to thermal substitutive ethane chlorinating conditions, for example, at a temperature above about 225° C., but below the temperature at which any substantial formation of undesired by-products is encountered, preferably in the range of from about 275° C. to about 525° C. and at a pressure ranging, for example, from about atmospheric to about 300 p. s. i. g. Particularly preferred is the temperature range of from about 375° to about 475° C., at a pressure of from about atmospheric to about 100 p. s. i. g. Under these conditions, interaction of ethane with chlorine will take place with the formation of reaction products consisting essentially of ethyl chloride and hydrogen chloride in the absence of substantial formation of undesired by-products. It is to be understood, however, that the invention is in no wise limited to the use of any specific substitutive ethane chlorinating conditions in chamber 40. Any suitable chlorinating conditions in either vapor or liquid state, with or without catalysts, with fixed or fluidized catalyst bed, which are capable of resulting in the conversion of the ethane to reaction products comprising ethyl chloride and hydrogen chloride may be maintained in the ethane chlorinating zone depicted by chamber 40, within the scope of the present invention.

Introduction of chlorine into chamber 40, through lines 41 and 37, is preferably controlled to result in substantially complete utilization of the chlorine within the chamber 40. The rate of chlorine introduction into chamber 40 is preferably controlled to result in a mol ratio of chlorine to ethane in the range of from about 1:2 to about 1:6, and still more preferably, from about 1:3 to about 1:4.

Desired temperature conditions are maintained in chamber 40 by control of the temperature of the ethane-containing charge and the chlorine charge by means of heat exchangers 35 and 42, respectively. Other means not shown in the drawing may be provided for the withdrawal of heat from, or the introduction of heat into, chamber 40. A valved line 36 is provided enabling the by-passing of indirect exchanger 35.

Effluence from chamber 40 will comprise ethyl chloride and hydrogen chloride and may contain ethane in an amount which will depend upon composition of the specific charge to chamber 40 and the specific conditions maintained therein. Since ethylene is not substantially affected under the preferred chlorinating conditions recited above this olefin will be present in the effluence from chamber 40 if present in the charge thereto. By-products, consisting essentially of chlorinated $C_2$ hydrocarbons other than ethyl chloride, will generally be present in only minor amounts. At least a part of the effluence leaving chamber 40 is passed to the hydrochlorinating chamber 12. Effluence consisting essentially of ethane chlorination reaction products comprising ethyl chloride and hydrogen chloride are passed from chamber 40, through lines 45 and 47, into line 13 which discharges into line 10 leading into chamber 12. A cooling means, such as, for example, a heat exchanger 46, is provided in line 45 to enable the removal of at least a part of the heat of reaction from the stream flowing through the line 45.

Although reactor effluent emanating from chamber 40 may be passed in part, or entirety, directly to hydrochlorinating chamber 12, it is preferably first freed of at least a part of its ethyl chloride content. At least a part of the effluence from chamber 40 is preferably passed through valved line 45 into a product separating zone wherein ethyl chloride is separated as a final product. The product separating zone may comprise, for example, a column 50. Within column 50, effluence from chamber 40 is subjected to fractionation to separate a vapor fraction comprising hydrogen chloride from a liquid fraction comprising ethyl chloride. The liquid fraction is separated from column 50 through valved line 51.

The vapor fraction, consisting essentially of hydrogen chloride and any unreacted hydrocarbons lower boiling than ethyl chloride which may be present such as ethane and ethylene, is withdrawn from column 50 through line 52, provided with cooler 53, discharging into an accumulator 54. Liquid is taken from accumulator 54 and passed through valved lines 55 and 56 to the top of column 50 as reflux. Line 56 is provided with suitable cooling means, such as a cooler 57. A normally gaseous stream comprising hydrogen chloride, and unreacted ethane and ethylene if these unreacted hydrocarbons are present in the effluence from chamber 40, is taken from accumulator 54 and passed through lines 58 and 13 into line 10 discharging into chamber 12. Hydrogen chloride emanating from chlorinating chamber 40 thus provides the hydrogen chloride utilized in effecting the ethylene hydrochlorination in chamber 12. When starting up the process, normally gaseous hydrocarbon charge may be cycled through the system to produce the required initial amount of hydrogen chloride. An initial amount of hydrogen chloride, produced, for example, in a previous completed cycle of operation, may be introduced into chamber 12 by suitable means not shown in the drawing for starting up the process.

To aid in maintaining optimum conditions, a portion of the product streams may be bled from the system through one or more of the valved lines 26, 29, 55 and 58.

EXAMPLE I

As an example of operation of the process according to the embodiment of Figure I, ethyl chloride is produced from chlorine and a normally gaseous hydrocarbon mixture consisting essentially of ethane and ethylene in a continuous process by continuously charging a normally gaseous mixture containing 52% ethane and 47% ethylene, the balance consisting of other normally gaseous hydrocarbons and hydrogen, into the system. The normally gaseous mixture is charged through line 10 and is admixed with a recycle stream from line 13, consisting essentially of hydrogen chloride, ethylene, ethane and containing minor amounts of other normally gaseous hydrocarbons and some residual ethyl chloride, emanating from the ethane chlorination step of the process as described below. The resulting admixture, containing 55% ethane, 17% ethylene and 22% hydrogen chloride, the balance consisting essentially of normally gaseous hydrocarbons other than ethane and ethylene, hydrogen and ethyl chloride, obtained by mixing the fresh normally gaseous hydrocarbon feed and recycle stream, is introduced into hydrochlorination reaction chamber 12 wherein it is contacted with a catalyst consisting of copper chloride-promoted zinc chloride on a porous aluminous support (Celite) at a temperature of 175° C., a pressure of 250 p. s. i. g. and a thoughput rate of 1 lb. of feed/hr./1.8 lbs. of catalyst. Ethyl chloride is separated in fractionator 21 from the effluence from the hydrochlorination reaction chamber and discharged from the system at 22. A 90% conversion of ethylene with a 99.5% yield of ethyl chloride on ethylene converted is obtained. The hydrochlorination reaction chamber effluent remaining after separating ethyl chloride therefrom contains 91.9% ethane and 2.8% ethylene, the balance consisting essentially of normally gaseous hydrocarbons other than ethane and ethylene, residual hydrogen chloride and ethyl chloride. A portion of the hydrochlorination reaction effluence remaining after separating ethyl chloride therefrom is continuously bled from the system at 29 in controlled amount to maintain the desired feed composition to the respective reaction chambers. 3.2% of the hydrochlorination chamber effluence is thus bled continuously from the system and the remainder introduced through lines 30 and 37 into chlorination reaction chamber 40. Chlorine from a source outside the system is introduced continuously through line 41 into the chlorination reaction chamber in an amount equal to 71% by weight of the ethane charged thereto. Within the chlorination reaction chamber the ethane-containing charge thereto is subjected to thermal ethane chlorinating conditions at 425° C., a pressure of 80 p. s. i. g. with a contact time of about 3 seconds. Complete chlorine conversion is attained in the chlorination reaction chamber. Ethyl chloride is separated from the effluence from the chlorination reaction chamber by fractionation in column 50 and eliminated at 51. The chlorination reaction chamber effluence remaining after separating ethyl chloride therefrom containing 56% ethane, 2.7% ethylene, 31.5% hydrogen chloride, the balance consisting essentially of normally gaseous hydrocarbons other than ethane and ethylene and residual ethyl chloride, is passed through lines 52 and 13 and used as the hydrogen chloride-containing recycle stream combined with the fresh normally gaseous hydrocarbon charge to the hydrochlorination reaction chamber as described above. A total yield of 94.6% is thus obtained based on total ethylene and ethane in the charge to the system converted. All percentage figures employed in the foregoing example are weight percent.

Another embodiment or modification of the present invention is illustrated in Figure II of the drawings and employs the so-called split-feed manner of operation. This procedure is especially advantageous when there are available two sources of supply, one rich in ethylene and the other rich in ethane.

Referring to Figure II of the drawings, an ethane-containing normally gaseous hydrocarbon stream, for example, an ethane-rich normally gaseous hydrocarbon fraction containing, for example, at least 50%, and preferably at least 75% by weight of ethane, the rest of the charge consisting essentially of ethylene and other normally gaseous hydrocarbons, obtained from an outside source, is forced through line 110 into suitable preheating means such as, for example, an externally heated coil 111 positioned in furnace 116. Additional quantities of ethane are supplied to feed line 110 through line 151 and comprise reaction products containing ethane derived from the hydrochlorination step in a manner to be described. From heating coil 111, the preheated ethane-rich hydrocarbon stream is passed through line 114 into a suitable chlorinating zone. The chlorinating zone may comprise any suitable apparatus enabling subjection of the ethane content of the charge thereto to substitutive chlorinating conditions. In the drawing the chlorinating zone is depicted by chamber 115. Chlorine emanating from an outside source is forced through line 117 into line 114 leading to chamber 115.

Within chamber 115, the normally gaseous hydrocarbon stream comprising ethane is subjected to substitutive chlorinating conditions which will result in the interaction of ethane and chlorine with the formation of reaction products comprising ethyl chloride and hydrogen chloride, together with unreacted ethane. The invention is in no wise limited to the use of any specific substitutive ethane chlorinating conditions within chamber 115 and any conditions may be employed therein resulting in the conversion of ethane to reaction products comprising ethyl chloride and hydrogen chloride. Particularly preferred chlorinating conditions are described in connection with Figure I, and the same or similar conditions may be employed in operating according to the present embodiment.

Effluence from chamber 115 will comprise ethyl chloride and hydrogen chloride, together with unreacted ethane in an amount which will depend upon composition of the specific charge to chamber 115 and the specific conditions maintained therein. Since ethylene is not substantially affected under the preferred chlorinating conditions recited above, this olefin will be present in the effluence from chamber 115 when present in the charge thereto. By-products, consisting essentially of chlorinated $C_2$ hydrocarbons other than ethyl chloride, will generally be present in only minor amounts.

Although reactor effluence emanating from chamber 115 may be passed in part, or entirety, directly to the hydrochlorinating zone of the process described hereinbelow, it is preferably first freed of at least a part of its ethyl chloride content. At least a part of the effluence from chamber 115 is preferably passed through line 118 into a product separating zone wherein ethyl chloride is separated as a final product. The product separating zone may comprise, for example, a column 120. A cooling means such as, for example, a heat exchanger 119, is provided in line 118 to enable the removal of at least a part of the heat of reaction from the stream flowing through the line 118. Within column 120, effluence from chamber 115 is subjected to fractionation to separate a vapor fraction comprising hydrogen chloride and ethane from a liquid fraction comprising ethyl chloride. The ethyl chloride-containing liquid fraction is withdrawn from column 120 through valved line 122 as a final product.

The vapor fraction, consisting essentially of hydrogen chloride and any unreacted hydrocarbons lower boiling than ethyl chloride which may be present such as ethane and ethylene, is withdrawn from column 120 through line 123, provided with cooler 124, discharging into an accumulator 125. Liquid condensate is taken from accumulator 125 and passed through valved lines 126 and 127 to the top of column 120 as reflux. Line 127 is provided with suitable cooling means such as a cooler 128.

A normally gaseous stream comprising hydrogen chloride and unreacted ethane is taken from accumulator 125 and passed through lines 130 and 131 into a hydrochlorinating zone. The hydrochlorinating zone may comprise any suitable type of apparatus enabling subjection of ethylene to ethylene hydrochlorinating conditions therein. In the drawing, the hydrochlorinating zone is depicted by a reaction chamber 135.

Normally gaseous hydrocarbons comprising ethylene, preferably an ethylene-rich normally gaseous hydrocarbon stream, for example, a $C_2$ hydrocarbon fraction containing at least about 50% and preferably at least 75% by weight of ethylene, the rest of the fraction consisting essentially of ethane and other normally gaseous hydrocarbons is taken from an outside source and forced through line 136 into line 131 leading to chamber 135.

The charge to chamber 135 will thus comprise ethylene taken from an outside source in addition to hydrogen chloride and unreacted ethane emanating from within the system through lines 130 and 131.

Within chamber 135, normally gaseous hydrocarbons are subjected to conditions resulting in the interaction of hydrogen chloride with ethylene with the formation of ethyl chloride. The addition hydrochlorination of ethylene is preferably carried out under conditions at which no substantial interaction of ethane with hydrogen chloride takes place. Suitable ethylene hydrochlorinating conditions comprise, for example, those described in connection with operation according to the embodiment of Figure I. Under such conditions ethane is substantially inert and ethylene will react with hydrogen chloride with the formation of reaction products consisting essentially of ethyl chloride and unreacted ethane containing a minimum of by-products. High conversions, based on the hydrogen chloride present, are readily obtained over extended periods of continuous operation.

The process of the invention is, however, in no wise limited to the maintenance of any specific ethylene hydrochlorinating conditions within chamber 135 and other suitable hydrochlorinating conditions enabling the addition of hydrogen chloride to the ethylene may be resorted to within the scope of the invention. The hydrochlorination may be carried out in liquid, vapor or mixed phase, all as described in connection with the embodiment of Figure I.

Temperatures in chamber 135 are maintained within the desired range with the aid of suitable means such as, for example, heat exchanger 137, and optionally by other means not shown in the drawing, enabling the addition or withdrawal of heat from reactants and from the reaction zone. The desired pressure conditions within chamber 135 are maintained with the aid of suitable means such as, for example, a compressor 138 and optionally other means not shown in the drawing. When the pressures maintained in chamber 135 are substantially below those within chamber 115, it is to be understood that compressor 138 may be by-passed by conventional by-pass means not shown in the drawing.

Effluence from chamber 135, consisting essentially of ethyl chloride and unreacted ethane, and which may contain hydrogen chloride in amounts governed by the specific hydrochlorinating conditions employed, is passed through line 139 to suitable product separating means. Within the product separating means, ethyl chloride is separated from the reaction products as a final product. The product separating means may comprise, for example, a column 140. Within column 140, a vapor fraction comprising unreacted ethane is separated from a liquid fraction comprising ethyl chloride. The liquid fraction comprising ethyl chloride is eliminated from column 140 by means of valved line 142 leading into line 122 and eliminated from the system as a final product.

The vapor fraction consisting essentially of unreacted ethane, and any normally gaseous materials comprising ethylene, chlorine, hydrogen chloride, inert gases, chlorinated hydrocarbon by-products, etc., present in the effluent stream from chamber 135 is taken overhead from column 140, through line 143, provided with condenser 144, leading into accumulator 145. Liquid condensate consisting essentially of ethane is passed from accumulator 145 through valved lines 147 and 148 provided with cooler 149, into the upper part of column 140 as reflux.

A normally gaseous stream consisting essentially of ethane and which may comprise ethylene, chlorine, hydrogen chloride, inert gases, chlorinated hydrocarbon by-products, etc., present in the effluent stream from chamber 135, is taken from accumulator 145 and recycled to chamber 115 through valved lines 150 and 151, discharging into line 110.

A particular advantage of the invention according to the aspect of Figure II, is directly attributable to the discovery of the ability to recycle directly to the chlorinating zone the effluent stream leaving chamber 135 after removal of substantially only crude ethyl chloride therefrom. However, the removal therefrom, in part or entirety of certain components such as chlorinated by-products, etc., should this be desired, may be carried out within the scope of the invention. Thus, the stream recycling through line 51 to the charge to the chlorinating zone may, if desired, be subjected to one or more such steps as, for example, adsorption, solvent extraction, distillation, extractive distillation, scrubbing, etc.

A compressor 152 is provided to enable the forcing of the recycle stream from accumulator 145 through lines 150 and 151 into line 110 when the pressure in line 110 exceeds that in accumulator 145. This is the case, for example, when the pressure within chamber 135 is substantially below that in chamber 115. Thus, the above-defined permissible liquid, or mixed, phase hydrochlorinating conditions comprises the use of pressures which may be substantially below pressures within the above-defined pressure range suitably maintained within chamber 115.

To avoid the building up of undesirable by-products or inert gases to excessive amounts within the system, a portion of the steam flowing through valved line 150 is eliminated periodically, or continuously, in controlled amount from the system. By thus returning the greater part of the effluence from accumulator 145 to the chlorinating zone, and bleeding only a limited controlled amount from the system, loss of $C_2$ hydrocarbons and of hydrogen chloride is reduced to a minimum. The discovery that the effluence from accumulator 145 may thus be recycled to the chlorinating zone without loss of efficiency enables the building up of undesired by-products to a relatively high concentration in the recycle stream flowing through lines 150 and 151. Since the bleed eliminated through valved line 150 from the system is concentrated with respect to by-products and unwanted inert gases, this represents in turn an additional reduction in loss of $C_2$ hydrocarbons and hydrogen chloride over that encountered in the absence of such a recycling operation.

As pointed out hereinbefore, the composition of the ethylene-rich stream introduced into the system through line 136 and that of the ethane-rich stream introduced through line 110 may vary considerably within the scope of the invention. Thus, they may consist essentially of pure ethylene and ethane, respectively, or comprise mixtures of ethylene and ethane in varying amounts. Although an advantage of the invention resides in its flexibility of operation, enabling its application to ethylene and ethane streams as generally available, feed fractionating means, not shown in the drawing, may be resorted to to adjust the composition of the ethylene and/or ethane streams charged to the system within the scope of the invention. Such feed fractionation may be resorted to to aid in obtaining the preferred ratio of ethylene to ethane in the total charge to the system. The feed fractionation, when employed, is preferably controlled to maintain the methane charged to the system at a minimum, for example, below about one mole percent. Comprised within the scope of the invention is the recycling of a portion of the effluence from the chlorination and/or hydrochlorination zone directly to the respective reaction zone from which the effluence emanates to aid in maintaining the desired operating conditions therein.

EXAMPLE II

As an example of operation of the process in accordance with the embodiment of Figure II, ethyl chloride is produced from chlorine, ethane-rich normally gaseous hydrocarbon stream and an ethylene-rich normally gaseous hydrocarbon stream in a continuous, completely integrated process comprising a vapor phase ethane chlorination step and a vapor phase hydrochlorination step as follows: All figures used throughout the example are in terms of parts per weight per unit time. 2479 parts of an ethane-rich fraction containing 221 parts of ethylene, 2241 parts of ethane and 17 parts of normally gaseous hydrocarbons, other than the $C_2$ hydrocarbons enter the system through line 110 and are combined with 5567 parts of chlorine introduced at 117, and 6429 parts of a recycle stream from line 151 obtained within the system as described below and the composition of which is given in the column A of the following Table I. The resulting mixture is introduced in continuous stream into the chlorination reactor 115 and therein subjected to thermal selective ethane chlorinating conditions at 420° C., a pressure of 80 p. s. i. g. and a contact time of about 3 seconds. The effluence from the chlorination reactor, having the composition in column B of Table I is quenched and introduced through line 118 into a first product separating zone 120. In the first product separating zone, a liquid fraction consisting of crude ethyl chloride is separated by fractionation from a vapor fraction containing the remainder of the chlorination reactor effluence. The liquid fraction, consisting of the crude ethyl chloride, is eliminated from the system through line 122 as a finished product. The vapor fraction from the first separating zone is passed through lines 123 and 131 and combined with 2158 parts of an ethylene-rich normally gaseous hydrocarbon fraction, introduced from an outside source through line 136, and containing 1949 parts of ethylene, 174 parts of ethane and 35 parts of hydrocarbons other than $C_2$. The resulting mixture, having the composition indicated in column C of Table I, is introduced in continuous stream into the hydrochlorination reaction chamber 135 wherein it is contacted in the vapor phase with a catalyst consisting essentially of copper chloride-promoted zinc chloride on a porous aluminous support (Celite), at a temperature of 193° C., a pressure of 250 p. s. i. g. and a throughput rate of one pound of feed/hr./1.8 bbls. of catalyst. Effluence from the hydrochlorinating reactor having the composition indicated in the column D of the following Table I is passed continuously through line 139 into second product separating zone 140 wherein a liquid fraction, consisting of crude ethyl chloride, is separated from a vapor fraction consisting of the remaining components of the hydrochlorination reactor effluence stream. The liquid fraction, consisting of crude ethyl chloride, separated in the second separating zone is eliminated from the system through line 142 as a final product. With the exception of 328 parts of bleed, consisting of 12 parts of ethylene, 289 parts of ethane, 14 parts of hydrocarbons other than $C_2$, and 13 parts of miscellaneous by-products, the remainder of the vapor fraction separated in the second product separating zone is employed as the recycle through line 151 which is combined with the ethane-rich feed charged to the chlorination reactor referred to hereinbefore. In this continuous operation, there are obtained 9876 parts of crude ethyl chloride containing 9041 parts of ethyl chloride and 835 parts of other chlorinated products.

*Table I*

[Composition in parts by weight.]

| | A | B | C | D |
|---|---|---|---|---|
| Ethylene | 232 | 498 | 2,447 | 244 |
| Ethane | 5,550 | 5,665 | 5,839 | 5,839 |
| Hydrocarbons other than $C_2$'s | 251 | 256 | 291 | 265 |
| Ethyl chloride | 59 | 4,059 | 812 | 5,853 |
| Chlorinated by-products | 97 | 816 | 134 | 250 |
| HCl | 240 | 3,181 | 3,181 | 253 |
| Total | 6,429 | 14,475 | 12,704 | 12,704 |

EXAMPLE III

As a further example an operation according to the embodiment of Figure II, ethyl chloride is produced from chlorine, ethane-rich normally gaseous hydrocarbon stream and an ethylene-rich normally gaseous hydrocarbon stream in continuous, completely integrated process comprising a vapor phase ethane chlorination step and a liquid phase ethylene hydrochlorination step as follows:

All figures used throughout the example are in parts by weight per unit time. 2535 parts of an ethane-rich fraction containing 225 parts ethylene, 2291 parts of ethane and 18 parts of hydrocarbons other than $C_2$'s are introduced through line 110 and combined with 5758 parts of chlorine and 10,308 parts of recycle stream from line 151 obtained within the system as described below and the composition of which is indicated in column A of the following Table II. The resulting mixture is introduced as a continuous stream into chlorination reactor 115 and therein subjected to thermal selective ethane chlorinating conditions at 420° C., a pressure of 80 p. s. i. g. and a contact time of about 3 seconds. The entire effluence from the chlorination reactor having the composition indicated in column B of the following Table II is quenched and introduced through line 118 into first product separating zone 120 wherein a liquid fraction, consisting of crude ethyl chloride, is separated from a vapor fraction consisting of the remainder of the chlorination reactor effluence. The vapor fraction is passed through lines 123 and 131 and combined with 2228 parts of an ethylene-rich normally gaseous hydrocarbon fraction containing 2013 parts of ethylene, 180 parts of ethane and 35 parts of hydrocarbons other than $C_2$'s introduced through line 136. The resulting mixture having the composition indicated in column C of the following Table II is introduced as a continuous stream into hydrochlorination reactor 135 and therein subjected to ethylene hydrochlorination conditions by contact with a liquid medium containing iron chloride (ferric chloride) dissolved in ethyl chloride, at a temperature of 49° C. and a pressure of 225 p. s. i. g. Effluence from the hydrochlorinator reactor having the composition indicated in the column D of the following Table II is passed through line 139 and subjected to fractionation in the second product separating zone 140 wherein a liquid fraction consisting of crude ethyl chloride is separated from a vapor fraction consisting of the remainder of the hydrochlorination reactor effluence. With the exception of 524 parts of bleed stream, containing 88 parts of ethylene, 298 parts of ethane, 14 parts of other hydrocarbons and 125 parts of miscellaneous by-products, which are eliminated from the system as bleed, the remainder of the vapor fraction is passed through line 151 and employed as the recycle stream combined with the ethane-rich normally gaseous hydrocarbon feed charged to the chlorination reactor as described hereinabove. In this continuous operation the combined liquid fractions, consisting of crude ethyl chloride, separated in the first and second product separating zones resulted in the obtaining of 9997 parts of crude ethyl chloride, 9041 parts of which was ethyl chloride and 956 parts of other chlorinated by-products.

*Table II*
[Composition in parts by weight.]

|  | A | B | C | D |
|---|---|---|---|---|
| Ethylene | 1,709 | 1,980 | 3,993 | 1,797 |
| Ethane | 5,765 | 5,883 | 6,063 | 6,063 |
| Hydrocarbons other than $C_2$'s | 262 | 268 | 303 | 276 |
| Ethyl chloride | 58 | 4,098 | 819 | 5,820 |
| Chlorinated by-products | 103 | 924 | 153 | 288 |
| HCl | 2,411 | 5,448 | 5,448 | 2,535 |
| Total | 10,308 | 18,601 | 16,779 | 16,779 |

It is seen that the process of the invention according to either embodiment thus provides an efficient and highly flexible process enabling the substantially complete conversion of the $C_2$ content of available ethylene and ethane streams or ethane-ethylene mixtures to desired ethyl chloride without need for hydrogen chloride from an external source and with a minimum of loss of charge material.

For the purpose of simplicity all parts of apparatus not essential to a complete understanding of the invention such as, for example, pumps, valves, accumulators, compressors and the like, have been omitted from the foregoing detailed description of the invention.

I claim as my invention:

1. The process for the production of ethyl chloride from a mixture of normally gaseous hydrocarbons consisting essentially of ethylene and ethane which comprises, subjecting said mixture to ethylene hydrochlorinating conditions with the aid of hydrogen chloride obtained within the system thereby forming hydrochlorination products comprising ethyl chloride and unreacted ethane, separating unreacted ethane from said hydrochlorination reaction products, substitutively chlorinating said separated unreacted ethane thereby forming chlorination products comprising ethyl chloride and hydrogen chloride, separating hydrogen chloride from said chlorination products, and passing at least a part of said separated hydrogen chloride to said hydrochlorination.

2. The process for the production of ethyl chloride from a mixture of normally gaseous hydrocarbons consisting essentially of ethylene and ethane which comprises, subjecting said mixture to ethylene hydrochlorinating conditions in a hydrochlorinating zone with the aid of hydrogen chloride obtained within the system, thereby reacting ethylene with hydrogen chloride with the formation of reaction products comprising ethyl chloride and unreacted ethane, subjecting at least a part of said unreacted ethane to substitutive ethane chlorinating conditions in a chlorinating zone, thereby reacting ethane with chlorine with the formation of reaction products comprising ethyl chloride and hydrogen chloride in said chlorinating zone, and passing at least a part of said reaction products from said chlorinating zone to said hydrochlorinating zone.

3. The process for the production of ethyl chloride from normally gaseous hydrocarbons comprising ethylene and ethane which comprises, subjecting said normally gaseous hydrocarbons to ethylene hydrochlorinating conditions with the aid of hydrogen chloride formed within the system in a hydrochlorinating zone, thereby reacting ethylene with hydrogen chloride with the formation of reaction products comprising ethyl chloride and unreacted ethane in said hydrochlorinating zone, passing at least a part of said unreacted ethane from said hydrochlorinating zone into a chlorinating zone, introducing chlorine into said chlorinating zone, subjecting said unreacted ethane to substitutive chlorinating conditions in said chlorinating zone, thereby reacting ethane with chlorine with the formation of reaction products comprising ethyl chloride and hydrogen chloride in said chlorinating zone, and passing at least a part of said hydrogen chloride from said chlorinating zone to said hydrochlorinating zone to be used therein as said hydrogen chloride obtained within the system.

4. The process in accordance with claim 3 wherein the mol ratio of ethane to ethylene in said normally gaseous hydrocarbons subjected to said hydrochlorination is at least about 1.

5. The process in accordance with claim 3 wherein the methane content of said normally gaseous hydrocarbons subjected to said hydrochlorination is below about 1 mol percent.

6. The process for the production of ethyl chloride from normally gaseous hydrocarbons comprising ethylene and ethane which comprises, subjecting said normally gaseous hydrocarbons to vapor phase catalytic ethylene hydrochlorinating conditions in a hydrochlorinating zone with the aid of hydrogen chloride formed within the system, thereby reacting ethylene with hydrogen chloride with the formation of reaction products comprising ethyl chloride and unreacted ethane in said hydrochlorinating zone, passing at least a part of said unreacted ethane from said hydrochlorinating zone into a chlorinating zone, introducing chlorine into said chlorinating zone, subjecting said unreacted ethane to thermal substitutive chlorinating conditions in said chlorinating zone, thereby reacting ethane with chlorine with the formation of reaction products comprising ethyl chloride and hydrogen chloride in said chlorinating zone, and passing at least a part of said hydrogen chloride from said chlorinating zone to said hydrochlorinating zone to be used therein as said hydrogen chloride obtained within the system.

7. The process in accordance with claim 6 wherein said ethylene hydrochlorination is effected in the presence of a catalyst comprising zinc chloride.

8. The process in accordance with claim 6 wherein said thermal substitutive ethane chlorination is effected at a temperature above about 225° C.

9. The process for the production of ethyl chloride from normally gaseous hydrocarbons comprising ethylene and ethane which comprises, subjecting said normally gaseous hydrocarbons to ethylene hydrochlorinating conditions in a hydrochlorinating zone with the aid of hydrogen chloride formed within the system, thereby reacting ethylene with hydrogen chloride with the formation of hydrochlorination products comprising ethyl chloride and unreacted ethane in said hydrochlorinating zone, separating unreacted ethane from said hydrochlorination products, substitutively chlorinating said separated unreacted ethane, thereby forming chlorination products comprising ethyl chloride and hydrogen chloride, separating hydrogen chloride from said chlorination products, and introducing at least a part of said hydrogen chloride into said hydrochlorinating zone to be used therein as said hydrogen chloride obtained within the system.

10. The process for the production of ethyl chloride from normally gaseous hydrocarbons comprising ethylene and ethane which comprises, subjecting said normally gaseous hydrocarbons to ethylene hydrochlorinating conditions in the vapor phase in a hydrochlorinating zone in the presence of a catalyst comprising zinc chloride and with the aid of hydrogen chloride formed within the system, thereby reacting ethylene with hydrogen chloride with the formation of hydrochlorination products comprising ethyl chloride and unreacted ethane in said hydrochlorinating zone, separating unreacted ethane from said hydrochlorination products, substitutively chlorinating said separated unreacted ethane at a temperature of at least about 225° C., thereby forming chlorination products comprising ethyl chloride and hydrogen chloride, separating hydrogen chloride from said chlorination products, and introducing at least a part of said hydrogen chloride into said hydrochlorinating zone to be used therein as said hydrogen chloride obtained within the system.

11. The process in accordance with claim 10 wherein the mol ratio of ethane to ethylene in said normally gaseous hydrocarbons introduced into said hydrochlorinating zone is at least about 1.

12. The process in accordance with claim 3 wherein a mixture comprising ethylene and ethane is introduced as fresh feed to the system into the hydrochlorinating zone along with reaction products including hydrogen chloride from the chlorinating zone.

13. The process in accordance with claim 3 wherein ethane as fresh feed to the system is introduced into the chlorinating zone along with reaction products including unreacted ethane from the hydrochlorinating zone, and wherein ethylene as fresh feed to the system is introduced into the hydrochlorinating zone along with reaction products including unreacted ethane and hydrogen chloride from the chlorinating zone.

No references cited.